(12) United States Patent
Raines et al.

(10) Patent No.: US 9,156,422 B1
(45) Date of Patent: Oct. 13, 2015

(54) ACTIVE BOLSTER WITH MULTIPLE BLADDERS ON SINGLE TRIM PIECE

(71) Applicant: FORD GLOBAL TECHNOLOGIES, LLC, Dearborn, MI (US)

(72) Inventors: Stacey H. Raines, Ypsilanti, MI (US); Sean B. West, Monroe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 5 days.

(21) Appl. No.: 14/461,578

(22) Filed: Aug. 18, 2014

(51) Int. Cl.
| | |
|---|---|
| *B60R 21/04* | (2006.01) |
| *B60R 21/045* | (2006.01) |
| *B60R 21/206* | (2011.01) |
| *B60R 21/00* | (2006.01) |

(52) U.S. Cl.
CPC .......... *B60R 21/04* (2013.01); *B60R 2021/0051* (2013.01); *B60R 2021/0407* (2013.01)

(58) Field of Classification Search
CPC .... B60R 21/04; B60R 21/045; B60R 21/206; B60R 2021/0051; B60R 2021/0407; B60R 2021/23169
USPC ....................... 280/729, 730.1, 732, 751, 752
See application file for complete search history.

(56) References Cited

U.S. PATENT DOCUMENTS

| | | | | |
|---|---|---|---|---|
| 3,747,952 | A * | 7/1973 | Graebe | 280/730.1 |
| 5,931,493 | A * | 8/1999 | Sutherland | 280/730.1 |
| 6,193,272 | B1 * | 2/2001 | Aigner et al. | 280/730.1 |
| 6,431,583 | B1 * | 8/2002 | Schneider | 280/728.2 |
| 6,435,554 | B1 * | 8/2002 | Feldman | 280/743.2 |
| 6,817,627 | B2 * | 11/2004 | Galmiche et al. | 280/730.1 |
| 7,762,577 | B2 * | 7/2010 | Kato et al. | 280/730.1 |
| 7,980,589 | B2 | 7/2011 | Best et al. | |
| 8,317,951 | B2 | 11/2012 | Parizat | |
| 8,360,471 | B2 * | 1/2013 | Sekino et al. | 280/753 |
| 8,376,396 | B2 * | 2/2013 | Miller et al. | 280/729 |
| 8,408,589 | B2 * | 4/2013 | Fukawatase et al. | 280/728.3 |
| 8,448,980 | B1 * | 5/2013 | Kalisz | 280/730.1 |
| 8,596,681 | B1 | 12/2013 | Strunk et al. | |
| 2004/0100080 | A1 * | 5/2004 | DePue et al. | 280/743.1 |
| 2010/0326782 | A1 * | 12/2010 | Vandenberge et al. | 188/372 |
| 2015/0061268 | A1 * | 3/2015 | Nagasawa | 280/730.1 |
| 2015/0066308 | A1 * | 3/2015 | Nagasawa | 701/45 |

FOREIGN PATENT DOCUMENTS

| | | | |
|---|---|---|---|
| JP | 2008120106 | | 5/2008 |
| JP | 2008120106 A | * | 5/2008 |

* cited by examiner

*Primary Examiner* — Laura Freedman
(74) *Attorney, Agent, or Firm* — Vichit Chea; MacMillan, Sobanski & Todd, LLC

(57) ABSTRACT

An active bolster protects a passenger in an automotive vehicle during a crash event. An interior trim panel has a front wall with a front surface facing the passenger and a back surface including a plurality of closed bonding tracks spaced laterally across the panel. A plurality of bladder walls each has an outer flange bonded to a respective bonding track, a plurality of pleats disposed annularly adjacent the respective outer flange and defining a respective extension length, and central mounting towers attaching the respective bladder wall to a reaction structure. A plurality of micro gas generators are each mounted to a respective bladder wall for inflating the respective bladder walls. Inflation causes unfolding of the respective pleats while the trim panel deploys away from the reaction structure by a non-uniform distance resulting from a bladder wall having a pleat extension length not equal to another laterally-spaced bladder wall.

7 Claims, 8 Drawing Sheets

ACTIVE BOLSTER WITH MULTIPLE BLADDERS ON SINGLE TRIM PIECE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to a trim panel supporting a plurality of separate bladder walls with individual micro gas generators to achieve a non-uniform deployment distance laterally across the trim panel.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes an outer wall (e.g., trim panel) that faces a vehicle occupant attached to an inner bladder wall along a sealed periphery. One or both of the walls is deformable in order to provide an inflatable bladder. For example, the inner wall may have a pleated (i.e., accordion-like) region that straightens out during inflation. The walls are initially spaced apart by a small amount when in their pre-deployment, non-inflated condition. This allows ingress of the inflation gas in a manner that can achieve an even inflation across the panel.

The inner and outer walls of a typical active bolster are comprised of molded thermoplastics such as polyethylene, polyolefin, or PVC. They are typically injection molded but can also be blow molded. When formed separately, the walls must be hermetically joined around their periphery in order to form the inflatable bladder. The joint must be strong to resist separation as a result of the high pressures during inflation.

In known systems, circumferential pleats have resulted in an expansion trajectory that is perpendicular to the Class A surface in a generally symmetrical manner. This expansion profile has been desirable in most situations where the potential passenger interaction is symmetrical across the face of the bolster. In some situations, however, the Class A surface may be skewed with respect to the impacting passenger. For example, an instrument panel or dashboard in front of a front passenger seat may be curved or swept so that a glove box door is closer to the passenger on the left side than on the right side. A symmetric expansion of an active bolster in the glove box door would result in an uneven impact of the passenger with the bolster.

U.S. Pat. No. 8,448,980, issued May 28, 2013, entitled "Active Bolster with Unsymmetric Pleated Inflation" discloses a bladder having pleats that are radially variable so that unfolding during inflation is biased in a particular direction. Limitations associated with the injection molding or blow molding processes used to manufacture a pleated bladder wall and the limited packaging space available within the vehicle trim structure (e.g., glove box door), the amount of biased expansion obtainable is also limited. For purposes of vehicle styling, it is sometimes desirable to employ significant sweep in the trim surfaces which makes it ever more challenging to achieve a desired deployment orientation for an active bolster.

It would also be desirable to improve the ability to tailor the kinematics of bolster deployment according to expected occupant impact requirements and to reduce the overall costs of active bolsters.

SUMMARY OF THE INVENTION

In one aspect of the invention, an active bolster is provided for protecting a passenger in a seating area of an automotive vehicle during a crash event. An interior trim panel of the vehicle is comprised of a front wall with a front surface facing the seating area and a back surface including a plurality of closed bonding tracks spaced laterally across the panel. There are a plurality of bladder walls, each having an outer flange bonded to a respective bonding track, a plurality of pleats disposed annularly adjacent the respective outer flange and defining a respective extension length, and central mounting towers attaching the respective bladder wall to a fixed reaction structure. A plurality of micro gas generators are each mounted to a respective bladder wall for supplying inflation gas to inflate the respective bladder wall during the crash event. Inflation of each bladder wall causes unfolding of the respective pleats while the trim panel deploys away from the fixed reaction structure by a non-uniform distance resulting from at least one bladder wall having a pleat extension length not equal to the pleat extension length of another laterally-spaced bladder wall.

DETAILED DESCRIPTION OF PREFERRED EMBODIMENTS

Figure 1:
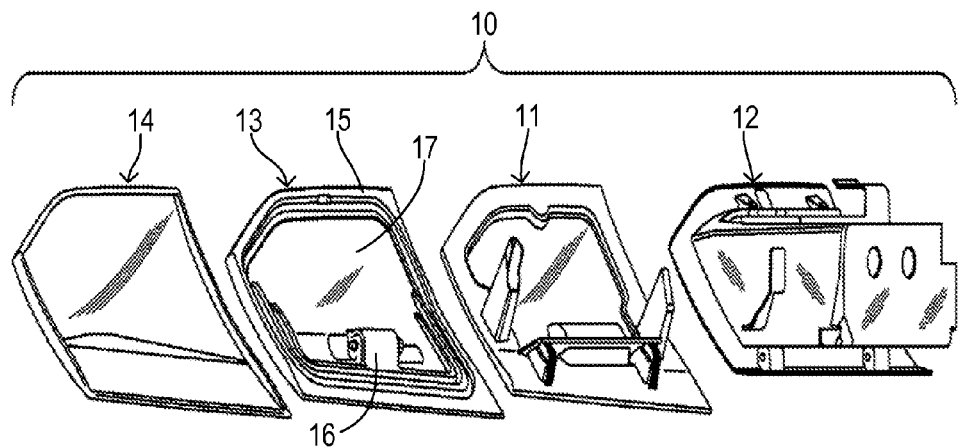
FIG. 1 is an outward-looking, exploded perspective view of an active knee bolster glove box door system of a type to which the present invention can be applied.

Referring now to FIG. 1, a prior art active knee bolster system 10 has a first wall or base panel 11 and a second wall or panel 14. Base 11 may be either attached to the vehicle by hinging from a storage cavity or glove box 12 as shown in FIG. 1, or mounted to another structure such as an instrument panel support below a steering column, for example. Such locations are accessible to the knees of an individual riding in a corresponding seating position within a vehicle.

Base 11 has a periphery 13 adapted to be sealed to second wall 14 having a matching periphery 15. Walls 11 and 14 are preferably comprised of molded plastics and may be joined by plastic welding, such as hot plate welding or vibration welding, to form a peripheral seal around an interior open space 17 for forming a bladder. An inflation gas source 16 is electronically controlled for activating during a crash event to release gas to inflate the bolster. Wall 14 may comprise the interior trim surface (e.g., the outside of the glove box door), or an additional skin (not shown) can be applied to the outer surface (i.e., Class A surface) of front panel 14. The skin is preferably constructed of plastic and may be a vacuum-formed thermoplastic bilaminate that may be grained or otherwise finished. Typically, wall 11 may be formed with a plurality of circumferential pleats (not shown) to increase the expanded size of the bladder. When an additional skin or cover is used, the pleats may also be located on wall 14.

Figure 2:
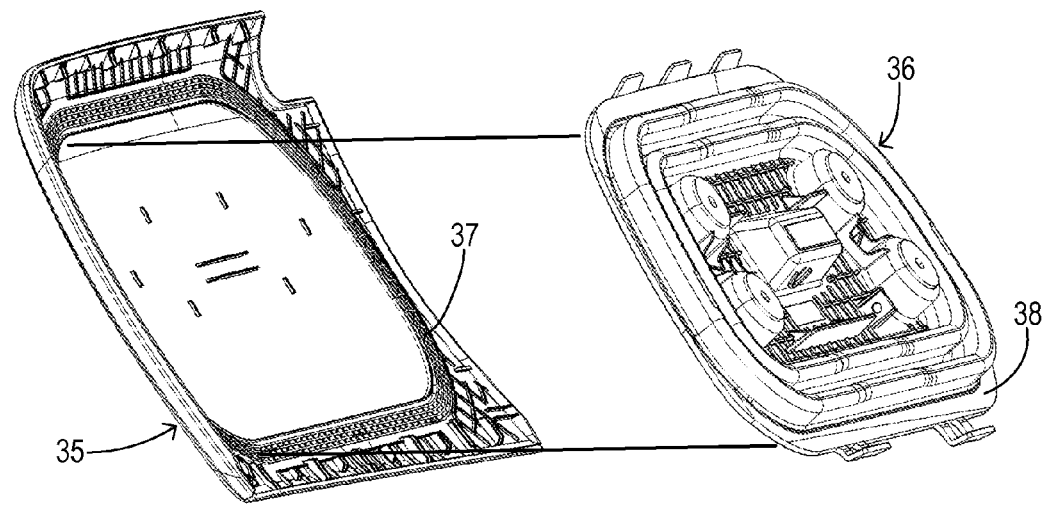
FIG. 2 is a perspective, exploded view of a prior art trim panel front wall and bladder back wall having continuous circumferential pleats.
Figure 3:
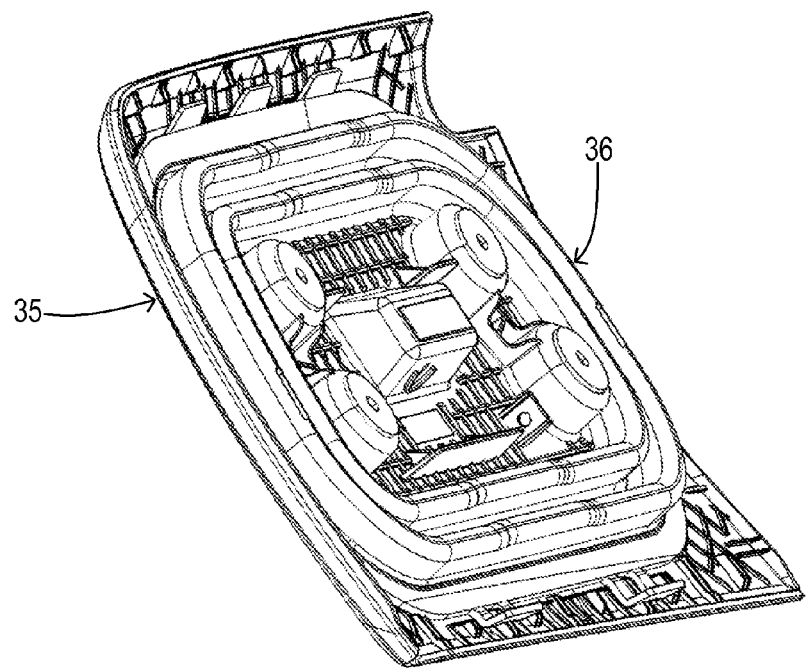
FIG. 3 is a perspective view of the walls of FIG. 2 after being welded together.

FIGS. 2 and 3 show a prior art active bolster wherein an interior trim panel of a vehicle acting as an active bolster is formed as a glove box door. A trim panel 35 functions as a front bladder wall which receives an expandable bladder wall 36. Panel 35 has a back surface with a bonding track or raceway 37 extending upward from the surface in order to bond with an outer flange 38 of bladder wall 36 (e.g., by plastic welding such as hot plate welding.

Figure 4:
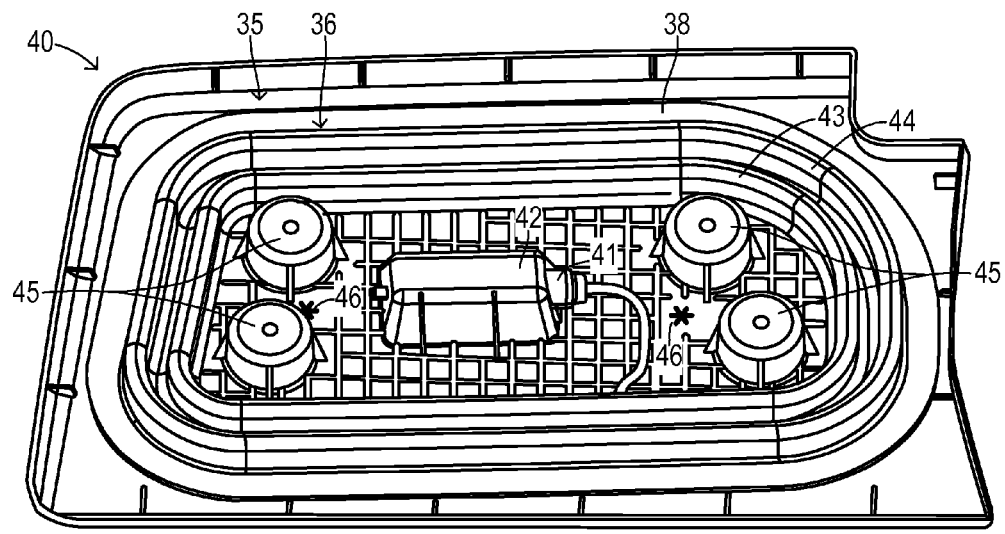
FIG. 4 is a rear, perspective view of the assembled unit of FIG. 2 with a hybrid inflator installed in a recess.

FIG. 4 is a rear view showing assembled bolster 40 in greater detail. Walls 35 and 36 are joined around a closed perimeter 38 to form an inflatable bladder having an open central volume between walls 35 and 36 to receive an inflation gas during a crash event from an inflator 41 mounted in a recess 42 of bladder wall 36. Bladder wall 36 includes a plurality of pleats, such as 43 and 44, to accommodate the expansion of bladder wall 36 during inflation. A plurality of bosses or towers 45 are used to mount bladder wall 36 to a vehicle support structure acting as a reaction surface (such as a glove box door inner wall). Vent holes 46 in bladder wall 36 may be included for venting the central volume prior to and during deployment.

Figure 5:
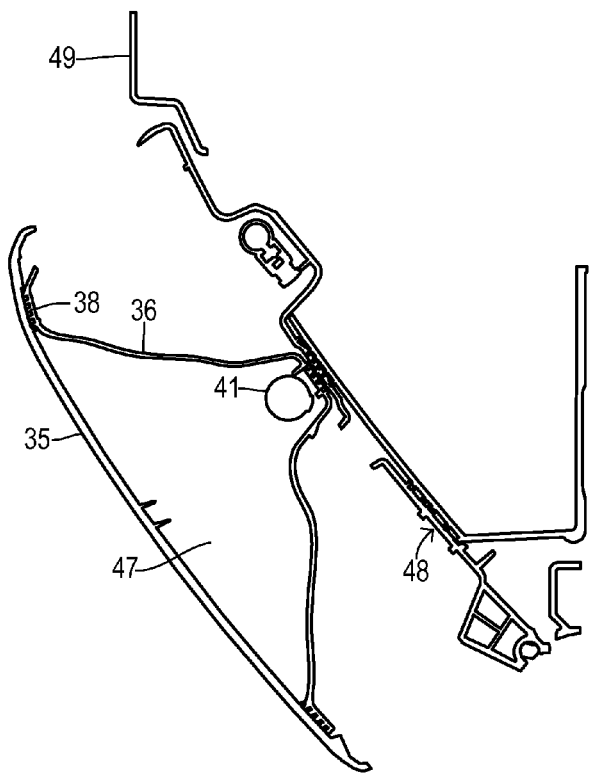
FIG. 5 is a cross section of an inflated active knee bolster installed in a glove box door.
Figure 8:
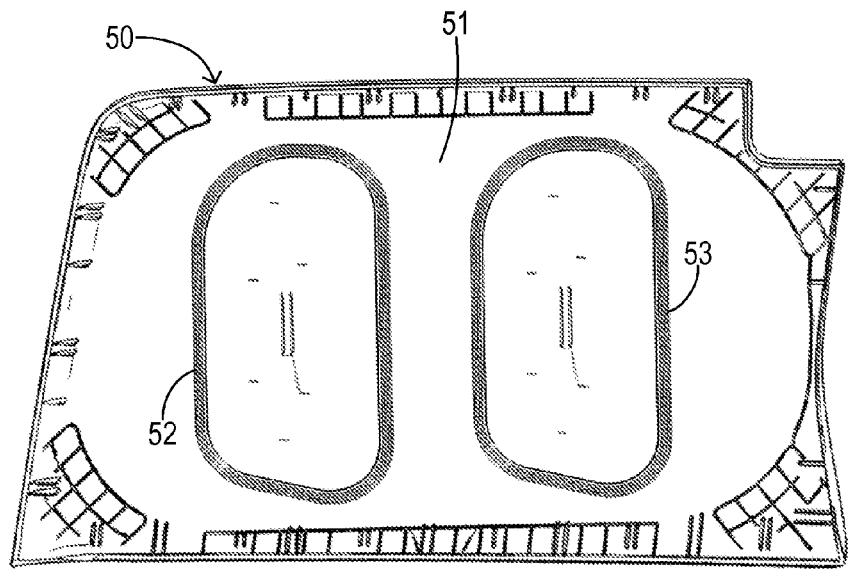
FIG. 8 is a rear, plan view of a front trim wall with a pair of closed bonding tracks for receiving respective bladder walls.

FIG. 5 shows the expansion of a central volume 47 in response to inflation gas from inflator 41, resulting in an outward movement of trim wall 35 away from a reaction structure comprised of a glove box inner wall 48 and an instrument panel surround or frame 49.

Figure 6:
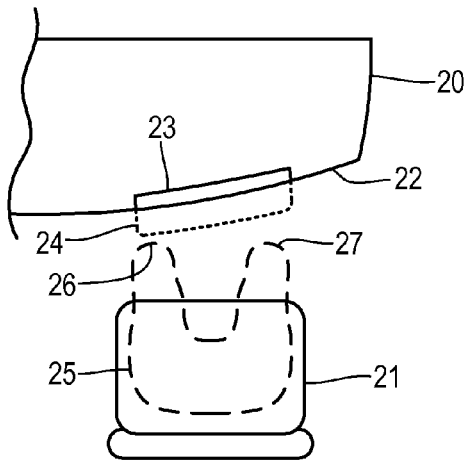
FIG. 6 is a top schematic view showing expansion of a bolster toward a passenger.

FIG. 6 shows an instrument panel 20 in front of a passenger seat 21. An outer passenger-facing or Class A surface 22 of instrument panel 20 is curved or swept such that it is not parallel with the front of the passenger (as defined by a plane at the front of their knees and lower legs, for example). A bolster 23 contained on the front surface of instrument panel 20 such as in a glove box door deploys with a trajectory perpendicular to Class A surface 22 resulting in a symmetrical expanded shape 24. A passenger 25 seated in seat 21 with knees 26 and 27 would be unequally impacted by symmetrical shape 24.

Figure 7:
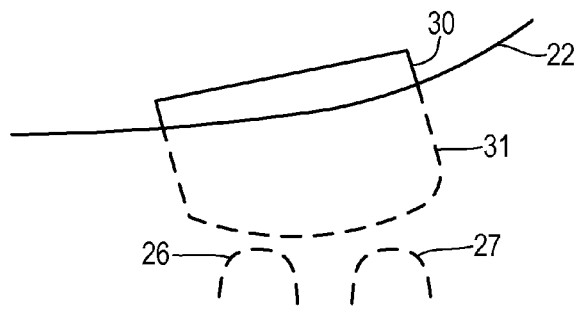
FIG. 7 is a top schematic view showing an uneven interaction between a symmetrically expanding bolster and a passenger in greater detail.

FIG. 7 shows an improved active bolster 30 contained on a skewed Class A surface 22. An asymmetrical expanded shape 31 is provided by the present invention for a more even interaction with knees 26 and 27 as described below.

FIGS. 8-11 show a first embodiment of the invention wherein a single trim panel supports two deployable bladder pods adapted to provide different pleat extension lengths in order to achieve and a biased deployment of the panel so that it may be deployed from a surface which is slanted with respect to the passenger to be protected during an impact. An interior trim panel 50 is shown as a front wall for an active glove box door. A front surface of panel 50 is configured to face a seating area of a passenger compartment within an automotive vehicle. Panel 50 has a back surface 51 including closed bonding tracks 52 and 53 spaced laterally across panel 50. Bonding tracks 52 and 53 may be heated/partially melted during hot welding to corresponding bladder walls in the conventional manner.

Figure 9:
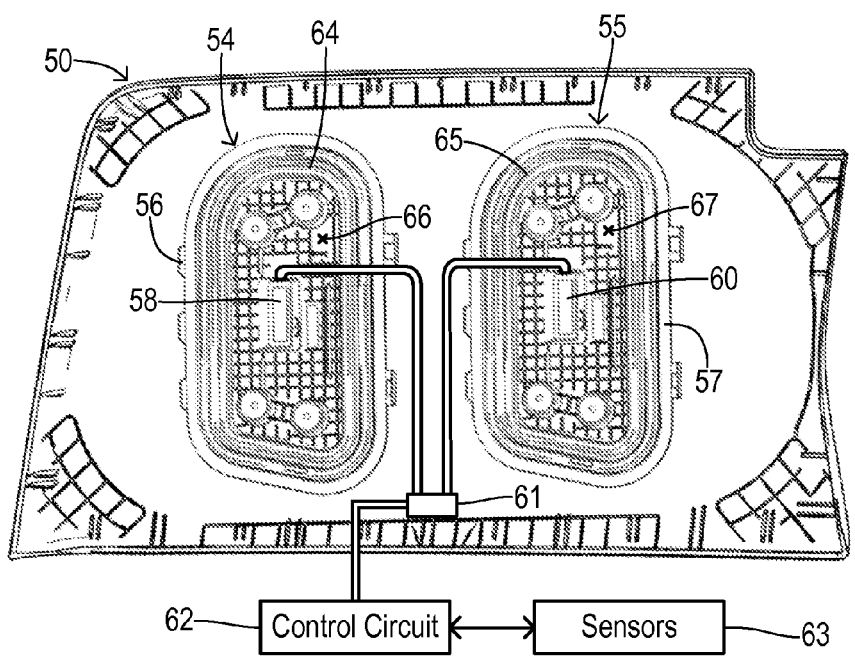
FIG. 9 is a rear, plan view of the front wall of FIG. 8 after assembly with bladder walls and installation of micro gas generators.

As shown in FIG. 9, a pair of bladder walls 54 and 55 are mated with bonding tracks 52 and 53. More specifically, bladder walls 54 and 55 include respective outer flanges 56 and 57 for welding with bonding tracks 52 and 53. Bladder walls 54 and 55 further include respective micro gas generators (MGG) 58 and 60 mounted into corresponding recesses and electrically wired to a connector 61. A control circuit 62 is connected via connector 61 to MGGs 58 and 60 in order to fire the micro gas generators in response to impacts detected using sensors 63.

Figure 10:
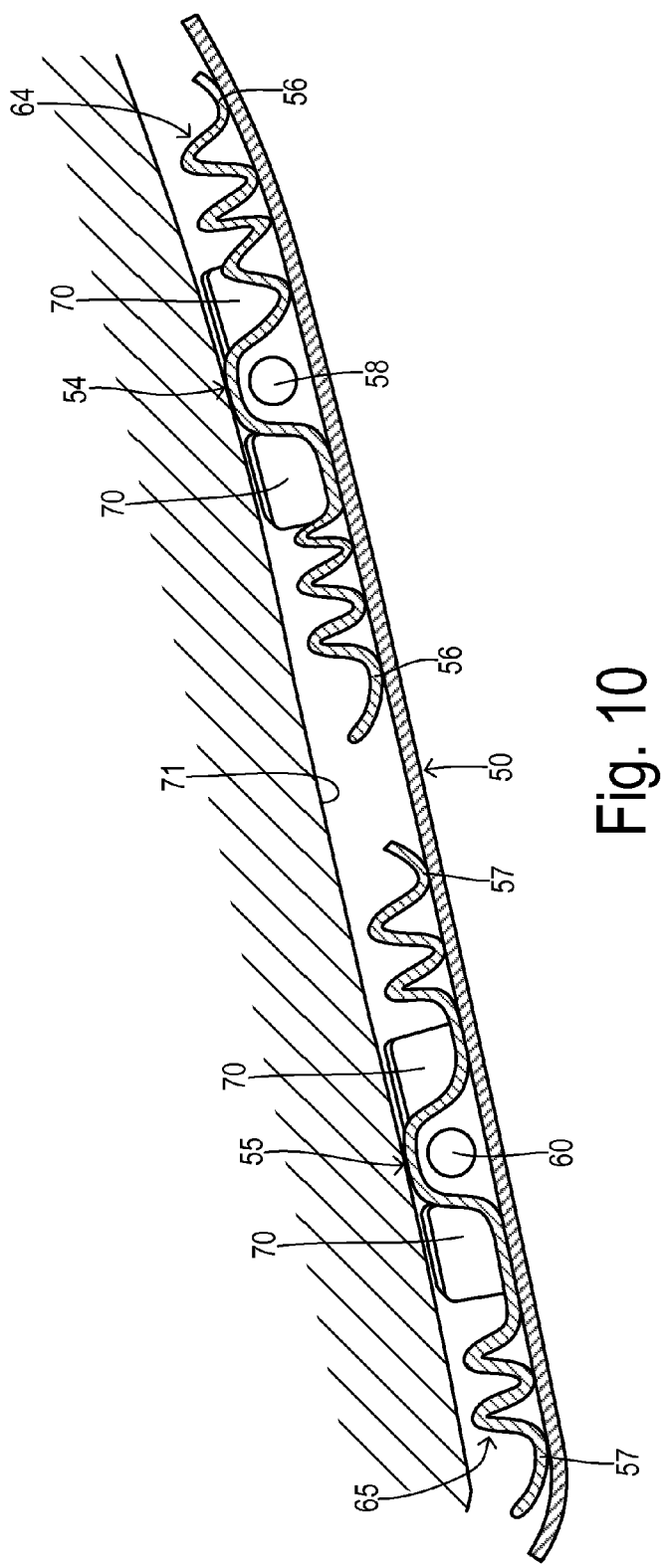
FIG. 10 is a cross section through the front and bladder walls of FIG. 9 prior to inflation.

Bladder walls 56 and 57 include respective pleats 64 and 65 disposed annularly adjacent respective outer flanges 56 and 57. Central mounting towers 70 attach bladder walls 54 and 55 to a fixed reaction structure such as a door rear wall 71 shown in FIGS. 10 and 11. Pleats 64 and 65 define respective extension lengths for bladder walls 54 and 55 in order to achieve a deployment of panel 50 by a non-uniform distance from reaction structure 71. The different extension lengths can be obtained using pleated sections that unfold to different lengths for the respective bladder walls, e.g., by varying the pleat heights or by using a different number of pleat folds. As shown in FIG. 10, bladder wall 54 on the right side of a passenger glove box door has a pleated section 64 with three folds, while left side bladder wall 55 has a pleated section 65 with two folds.

Figure 11:
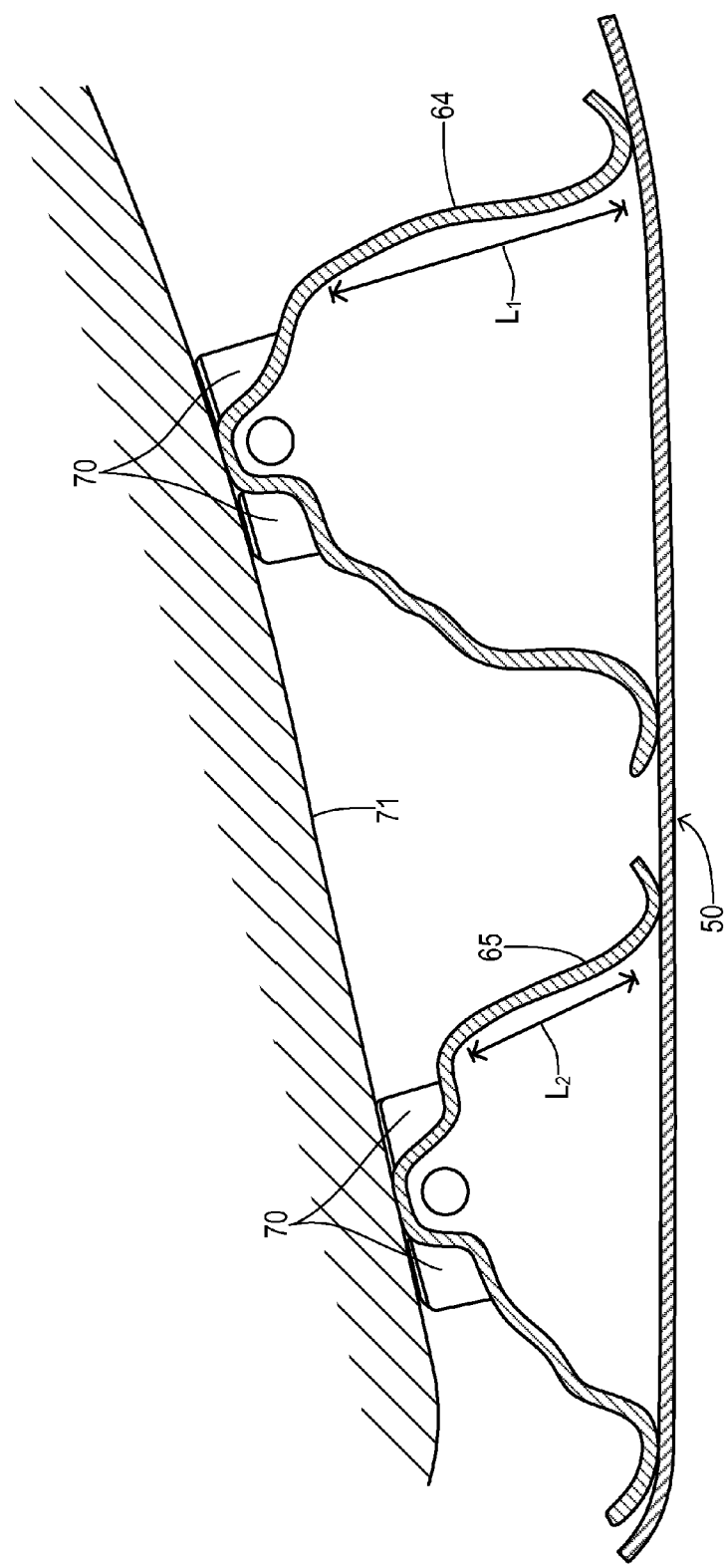
FIG. 11 is a cross section showing the walls of FIG. 10 after inflation.

As shown in FIG. 11, the greater number of folds provides a longer extension length $L_1$ for bladder wall 54 than extension length $L_2$ for bladder wall 55. As a result, trim wall 50 expands outward from sloped reaction surface 71 to provide an unslanted deployment position for receiving the knees and lower legs of a passenger.

The micro gas generators employed in the present invention are comprised of miniature inflators of a type normally used to produce a small amount of gas for seat belt pretensioning devices or other small supplemental restraint applications. A typical micro gas generator typically has a size no larger than about 20 mm×20 mm. The use of multiple bladder pods with respective micro gas generators achieves improved control of active bolster deployment while reducing costs since the total amount of inflation gas are reduced. In addition, more precise control of panel deployment and impact resistance can be obtained. The MGGs can have different gas capacities so that impact resistance felt by an impacting passenger can be varied laterally across the trim wall. Similarly, bladder walls 54 and 55 can include respective vents 66 and 67 with different venting capacities in order to adjust an impact resistance provided by the active bolster that is laterally variable across trim panel 50. Since both inflation characteristics and venting characteristics can be independently adjusted for different locations on trim panel 50, significant design flexibility is obtained for meeting desired impact performance.

Figure 12:
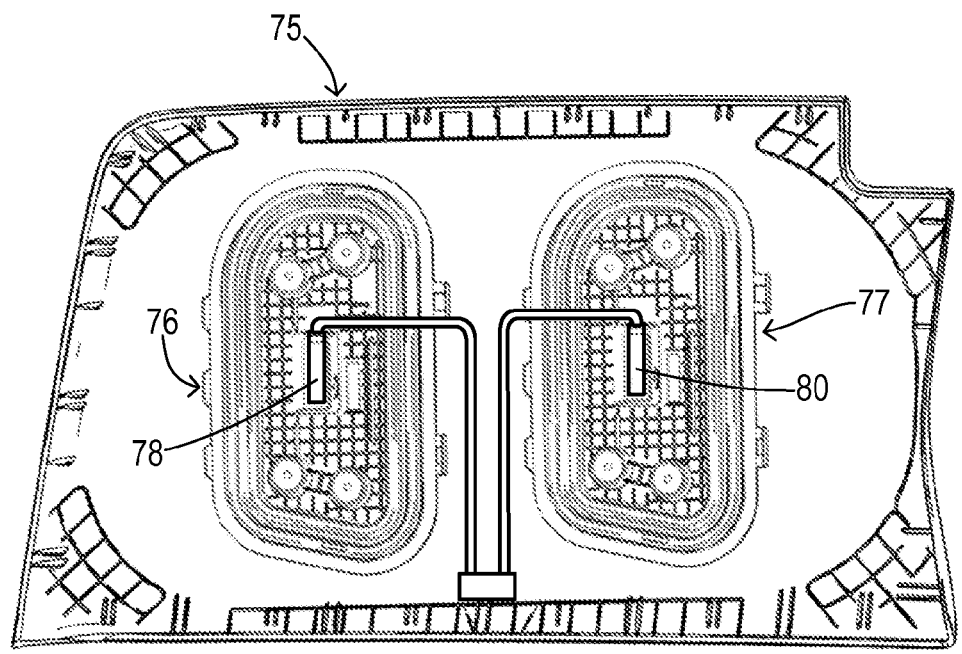
FIG. 12 is another embodiment of the invention wherein bladder walls of different sizes produce a biased expansion.

FIG. 12 shows an alternative embodiment wherein a trim panel front wall 75 supports first and second bladder walls 76 and 77 wherein bladder wall 76 has a larger diameter and longer pleat extension length than bladder wall 77. Bladder wall 76 also has a larger expansion volume so that a larger MGG 78 would be installed in bladder wall 76 than MGG 80 installed in bladder wall 77.

Figure 13:
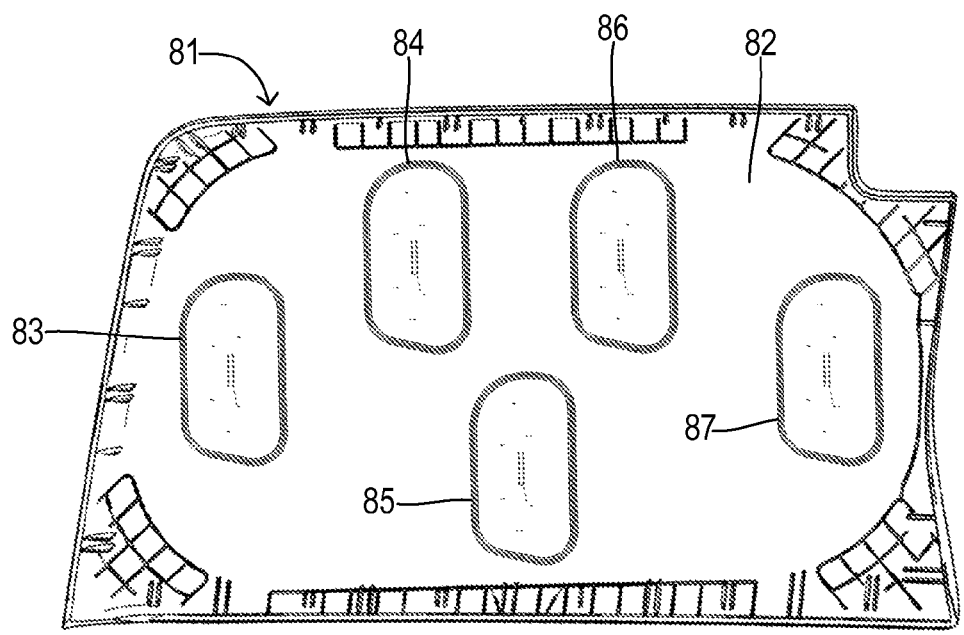
FIGS. 13 and 14 are rear, plan views of another embodiment of a single trim wall with multiple bladder walls.
Figure 14:
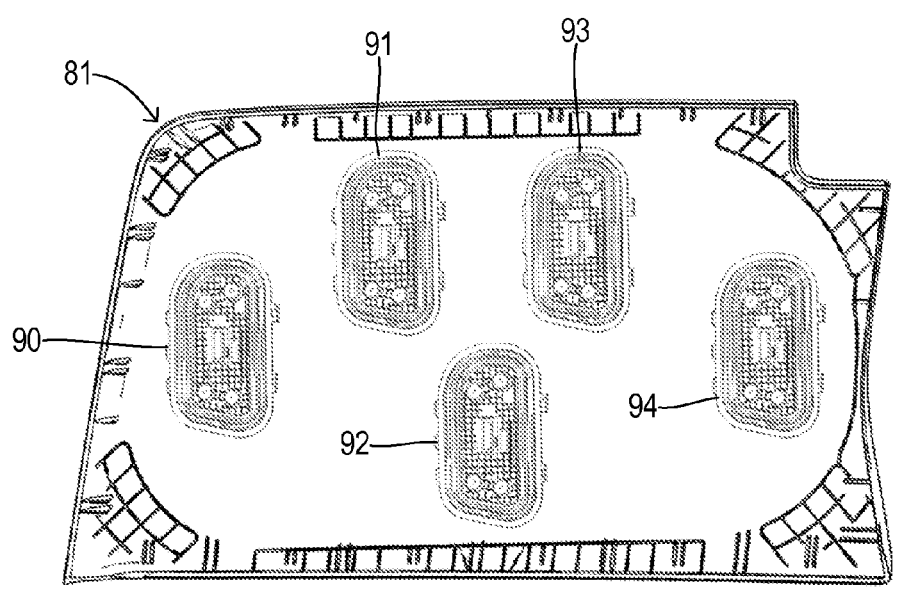

FIGS. 13 and 14 show another embodiment wherein a greater number of bladder walls are supported on a single trim wall. Thus, a front wall 81 for a glove box door has a back surface 82 configured to provide closed bonding tracks 83-87 spread out laterally across trim panel 81. Bonding track locations may be symmetrical or non-symmetrical. A plurality of bladder walls 90-94 are bonded to tracks 83-87. Pleat extension lengths, venting capacities, and the gas capacities for respective micro gas generators can all be varied from one bladder wall to the next in order to adjust both the deployment distance and impact resistance for various sections of trim wall 81.

What is claimed is:

1. An active bolster for protecting a passenger in a seating area of an automotive vehicle during a crash event, comprising:
   an interior trim panel of the vehicle, wherein the trim panel has a front surface facing the seating area and a back surface including a plurality of closed bonding tracks spaced laterally across the panel;
   a plurality of bladder walls, each having an outer flange bonded to a respective bonding track, a plurality of pleats disposed annularly adjacent the respective outer flange and defining a respective extension length, and central mounting towers attaching the respective bladder wall to a fixed reaction structure;
   a plurality of micro gas generators, each mounted to a respective bladder wall for supplying inflation gas to inflate the respective bladder wall during the crash event;
   wherein inflation of each bladder wall causes unfolding of the respective pleats while the trim panel deploys away from the fixed reaction structure by a non-uniform distance resulting from at least one bladder wall having a pleat extension length not equal to the pleat extension length of another laterally-spaced bladder wall.

2. The bolster of claim 1 wherein the interior trim panel is comprised of a glove box door disposed in front of a passenger seat, wherein the glove box door has a left side and a right side, wherein a spacing between the left side and the seat is less than a spacing between the right side and the seat, wherein the plurality of bladder walls is comprised of a left bladder wall and a right bladder wall, and wherein the right bladder wall has a pleat extension length greater than a pleat extension length of the left bladder wall so that the right side deploys away from the fixed reaction structure by a right deployment distance which is greater than a left deployment distance of the left side.

3. The bolster of claim 2 wherein the right bladder wall has a first number of pleats and the left bladder wall has a second number of pleats, and wherein the first number of pleats is larger than the second number of pleats.

4. The bolster of claim 1 wherein the micro gas generators have respective gas capacities that are not all equal so that resistance to an impact on the front surface varies laterally.

5. The bolster of claim 1 wherein the bladder walls each has respective venting capacity to vent the inflation gas, and wherein the venting capacities are not all equal so that resistance to an impact on the front surface varies laterally.

6. The bolster of claim 5 wherein each outer flange is welded to the respective bonding track.

7. An active knee bolster comprising:
   a glove box door panel with a back surface including laterally spaced bonding tracks;
   a plurality of bladder walls bonded to respective bonding tracks and having respective pleats disposed around central towers attaching the respective bladder wall to a reaction surface, the pleats defining respective extension lengths; and
   a respective micro gas generator mounted to each bladder wall for unfolding the respective pleats so the door panel deploys non-uniformly.

\* \* \* \* \*